F. W. MARTIN.
WATER GAUGE FOR TANKS.
APPLICATION FILED JULY 24, 1919.
1,408,218.
Patented Feb. 28, 1922.
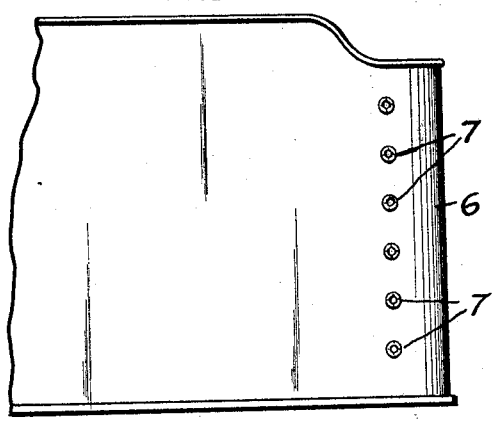
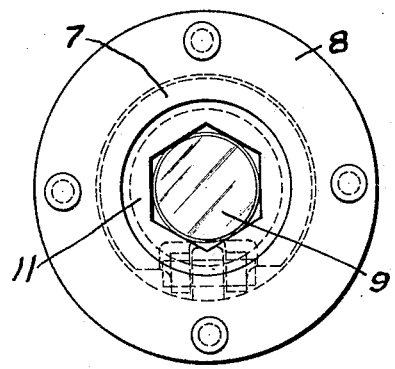
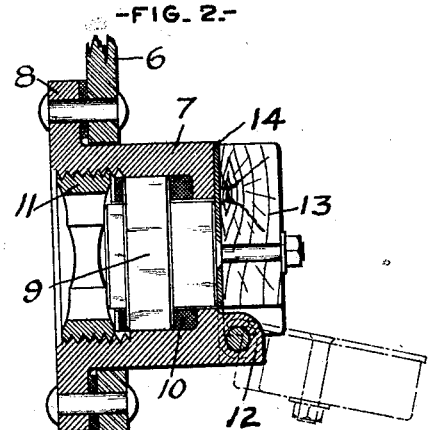
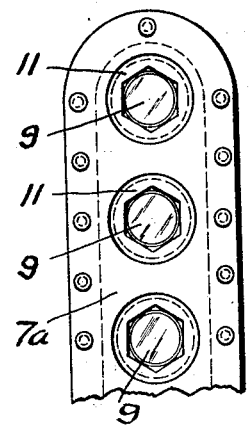
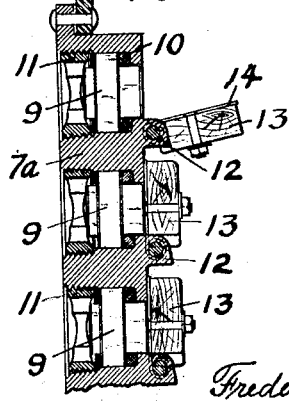
INVENTOR
Frederick W. Martin
BY
Edward K. Wright
ATTORNEY

UNITED STATES PATENT OFFICE.

FREDERICK W. MARTIN, OF NEW YORK, N. Y.

WATER GAUGE FOR TANKS.

1,408,218.  Specification of Letters Patent.  Patented Feb. 28, 1922.

Application filed July 24, 1919. Serial No. 312,946.

*To all whom it may concern:*

Be it known that I, FREDERICK W. MARTIN, of Manhattan Beach, in the county of Kings and city and State of New York, have invented a certain new and useful Improvement in Water Gauges for Tanks, of which improvement the following is a specification.

This invention relates to means for indicating the level of the liquid in a tank or other chamber, and is particularly adapted for use in connection with the water tank of a locomotive tender.

In many instances, it is inconvenient and impracticable to apply an ordinary water gauge glass to a vessel or tank for indicating the height of water or other liquid, as in the case of a locomotive tender, as such a glass, projecting from the side of the tank would be in the way, and constantly liable to be broken by objects striking the same. It is also impracticable to insert a glass in the side of the tank for the reason that it is so dark inside the tank that the water level will not show with sufficient clearness to be observed.

The object of my invention is to provide an improved float operated indicating means having a color in contrast to the dark interior of the tank, so as to be clearly visible through a gauge glass in the side of the tank.

In the accompanying drawings: Figure 1 is a side elevation of a water tank of a locomotive tender, showing my improvement applied thereto; Fig. 2, a transverse section of one of my improved indicating devices upon a larger scale; Fig. 3, a front elevation of the same; Fig. 4, a sectional view showing a modification; and Fig. 5, a front elevation of the form of the device shown in Fig. 4.

According to my improvement, a sight glass may be mounted in any suitable or preferred manner in the side wall of the tank or other vessel in which the level of the water or other liquid is to be indicated, and a float having a bright plate, preferably white, is pivotally mounted within the tank and adapted to be actuated by the rise and fall of the water level to display the white indicator or plate over the inside of the glass when the water level rises to or above the float, and to withdraw the indicator from the glass so as to show only the dark interior of the tank when the water level falls below the float.

A preferred construction, as applied to a locomotive water tank, 6, is shown in the drawing, and comprises a casing, 7, inserted through an opening in the side wall of the water tank, and having a flange, 8, by means of which it may be rigidly secured in position by bolts or rivets, thereby making a water tight joint with the wall of the tank. The casing contains a sight glass, 9, which may be in the form of a bull's-eye, inserted in the opening at the inner end of the casing, and held therein by suitable packing rings, 10, and a gland or bushing, 11, threaded into the outer end of the casing, and adapted to be screwed down to clamp the packing rings and sight glass securely in place.

At the inner end of the casing, there is a bracket, 12, on which the float, 13, is pivoted or hinged to swing vertically with the rise and fall of the water level. The float may be made of wood or other suitable material. The bracket also forms a stop for the hinged joint to limit the downward movement of the float to substantially its horizontal position. A white enamelled metal plate, 14, is preferably employed as the indicating surface, and may be attached to the float so that as the float swings up to its vertical position by the rise in the water level, the white plate covers over the end of the casing and the sight glass, making it visible to the observer.

It will now be apparent that, as the water level falls, the float will swing downward by gravity, until it reaches substantially a horizontal position where it is held by the stop, thereby withdrawing the white indicating plate from the line of vision through the glass and showing only the dark interior of the tank. As the water level rises to and above the float, it swings the same upward to its vertical position and displays the white indicator against the glass.

These indicator casings may be spaced at regular or suitable intervals in the side of the tank, as indicated in Fig. 1, and the height of the water may be readily determined as between the highest one of the indicators showing the white plate, and the next one above which will appear dark.

Where it is desired to show the water level more accurately, the indicators may be placed close together vertically, and a single elongated casing 7ª, containing a number of closely mounted sight glasses and floats, such as shown in Figs. 4 and 5, may be employed, if desired.

Having now described my invention, what I claim as new and desire to secure by Letters Patent is:

1. A liquid gauge for tanks, comprising a casing, a sight glass mounted in the outer end of said casing, a bracket integrally attached at its inner end, and a float pivoted on said bracket and having an indicating face and adapted to rise and fall with the level of the water adjacent the sight glass, said bracket having a stop for limiting the downward movement of the float.

2. A liquid gauge for tanks, comprising an elongated casing, a plurality of separate sight glasses held therein, a bracket on said casing below each sight glass, and a float pivoted on each bracket and adapted to rise and fall with the level of the water adjacent its respective sight glasses, said brackets having stops for limiting the downward movement of the floats.

In testimony whereof I have hereunto set my hand.

FREDERICK W. MARTIN.